Jan. 26, 1965   W. W. JONES   3,167,209
FLEXIBLE TANK LINER
Original Filed Nov. 20, 1957   5 Sheets-Sheet 1
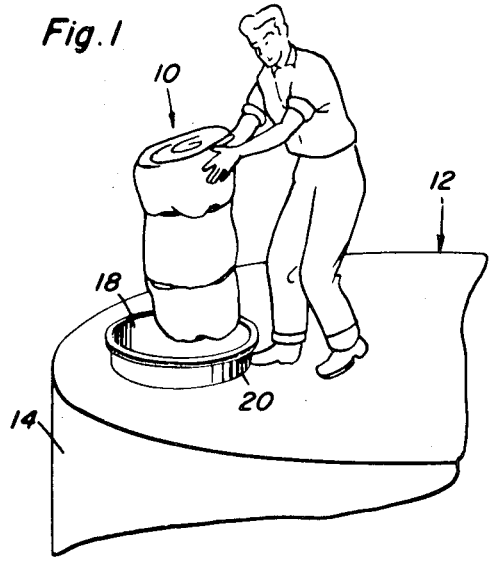
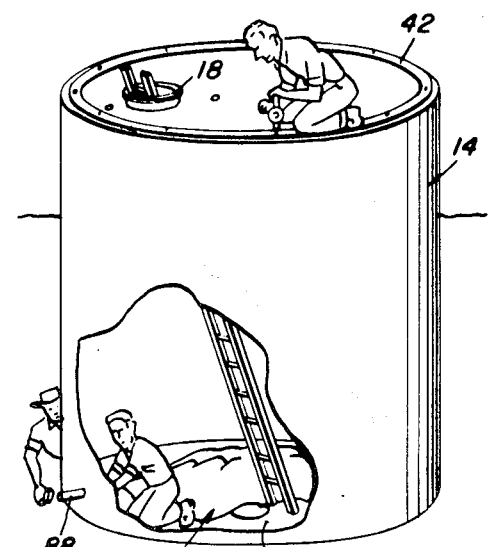
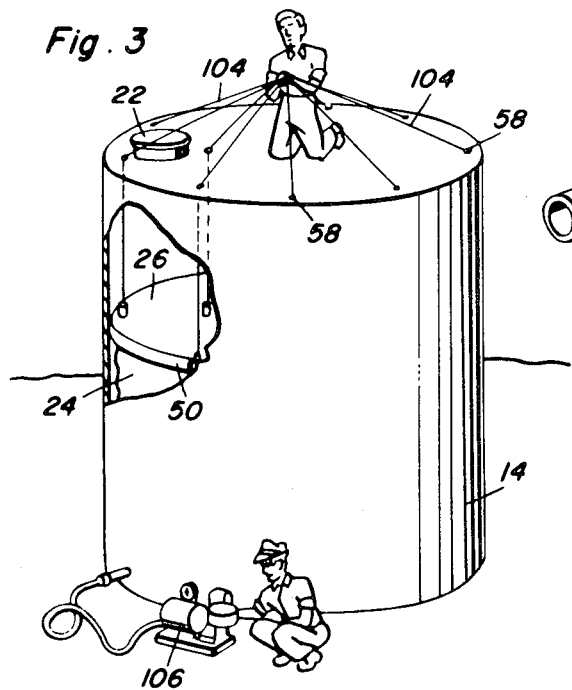
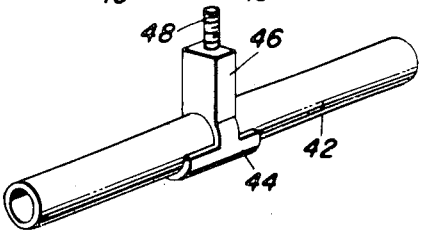
Wayne W. Jones
INVENTOR.
BY
ATTORNEY

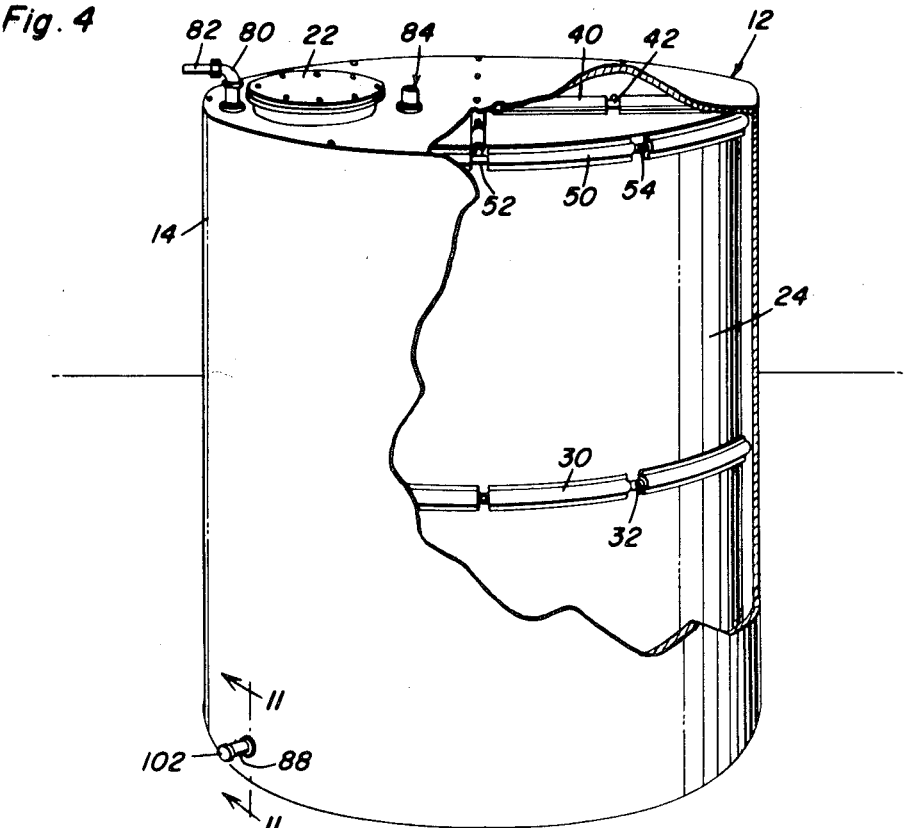
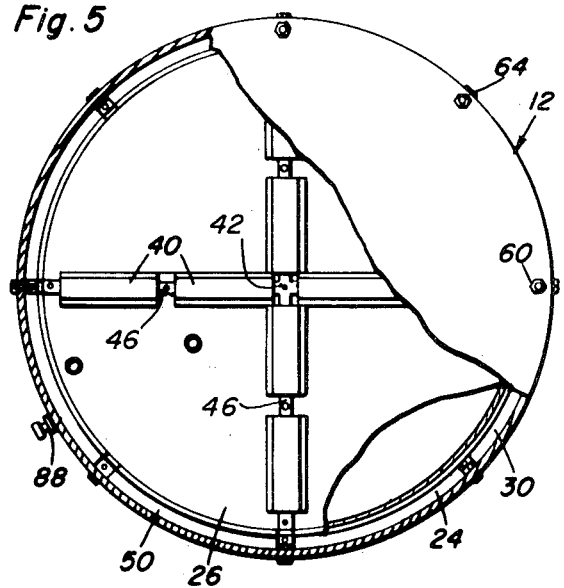
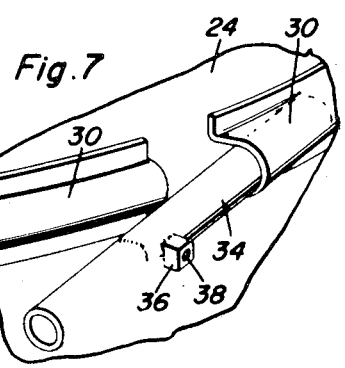
Wayne W. Jones
INVENTOR.

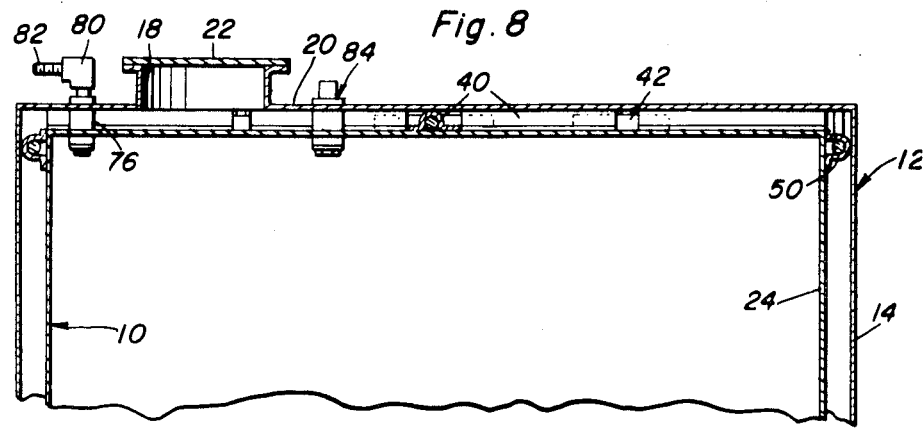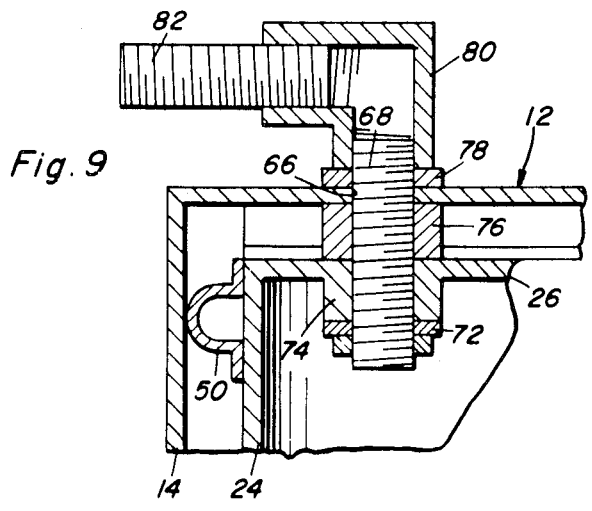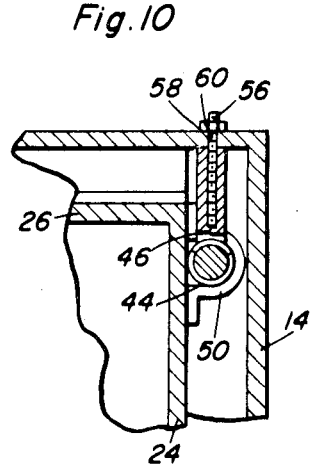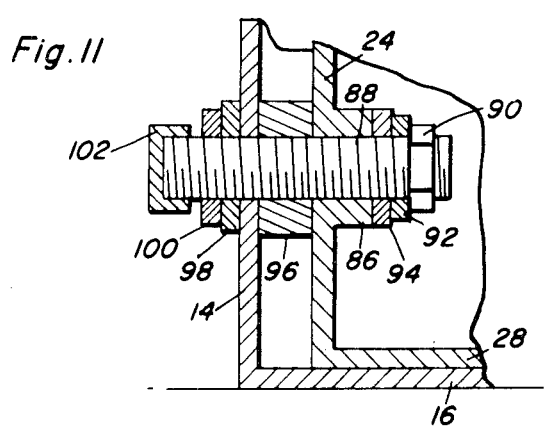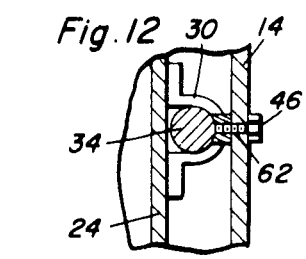

Jan. 26, 1965 W. W. JONES 3,167,209
FLEXIBLE TANK LINER
Original Filed Nov. 20, 1957 5 Sheets-Sheet 4

INVENTOR.
WAYNE W. JONES
BY
ATTORNEY

Jan. 26, 1965    W. W. JONES    3,167,209
FLEXIBLE TANK LINER
Original Filed Nov. 20, 1957    5 Sheets-Sheet 5
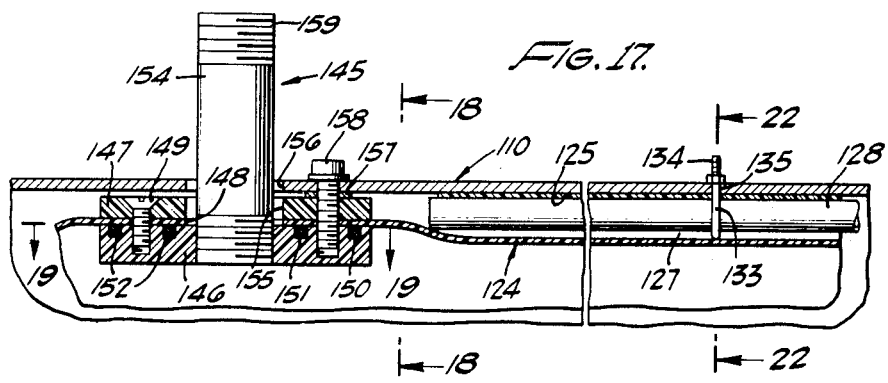
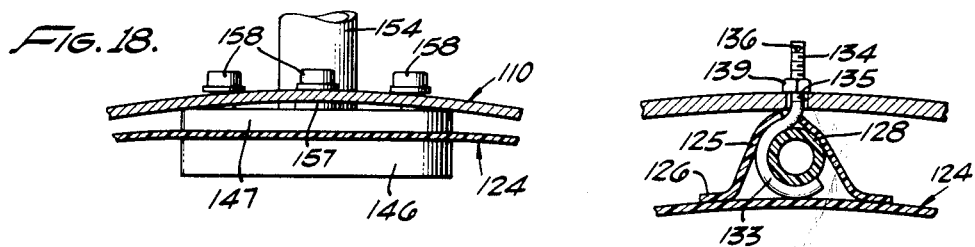
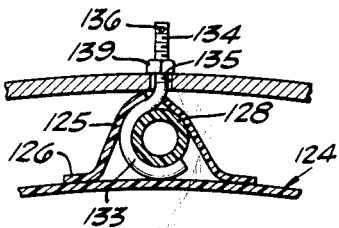
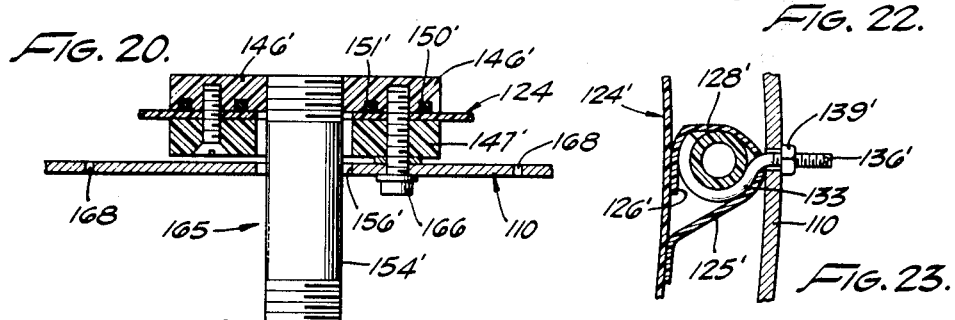
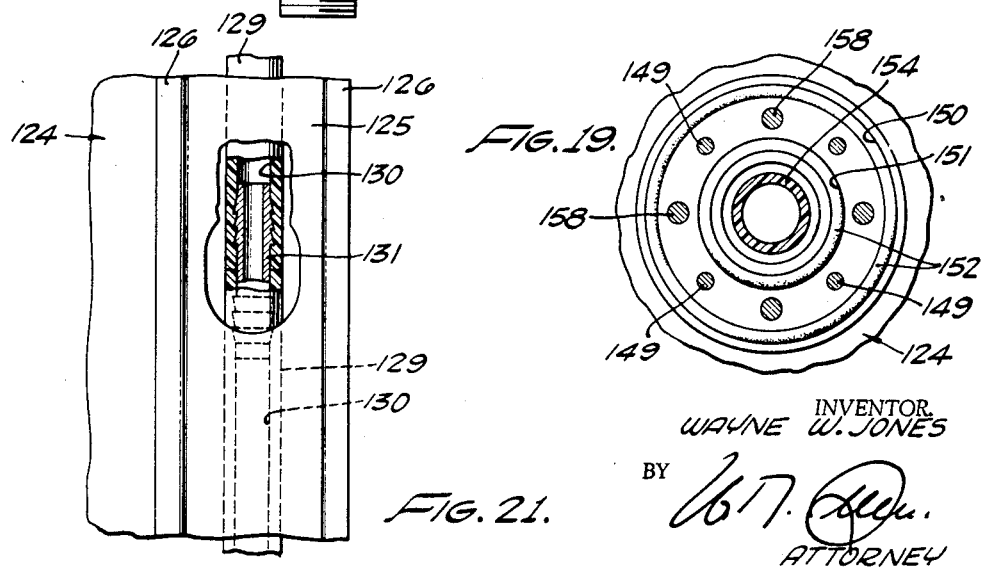
INVENTOR.
WAYNE W. JONES
BY
ATTORNEY

3,167,209
FLEXIBLE TANK LINER
Wayne W. Jones, 546 Arbolada Drive, Arcadia, Calif.
Original application Nov. 20, 1957, Ser. No. 698,023, now Patent No. 3,068,561. Divided and this application June 11, 1962, Ser. No. 201,657
15 Claims. (Cl. 220—63)

This invention relates to flexible tank liners and more particularly to a tank liner assembly suitable for installation in previously erected storage tanks as well as a method of installing the assembly therein.

The present application is a division of my co-pending application for United States Letters Patent, Serial No. 698,023, filed November 20, 1957, entitled Flexible Tank Liner and Method of Installing Same, now Patent No. 3,068,561; which application is a continuation-in-part of my application for United States Letters Patent, Serial No. 506,520, filed May 6, 1955, entitled Method of Installing Flexible Tank Liners; and to my application for United States Letters Patent Serial No. 473,104, filed December 6, 1954, for Tank Liner.

Large capacity storage tanks of either the wood stave or the roller sheet metal type not infrequently are required for use in storing fluids likely to attack the tank walls. In other situations, it is found that the tank walls have deteriorated over a period of usage and either are leaking or are in danger of leaking. If the fluid to be stored is inflammable, toxic, corrosive or presents other hazards if allowed to escape, the tank cannot be used and it is necessary to erect a new tank, make costly and time-consuming changes or to forego the storage of the liquid in that tank. In other instances, while the tank owner feels confident that it is safe to store the liquid, the consequences should a leak subsequently occur present such serious potential dangers that the risk involved cannot be assumed.

Proposals have been made heretofore for safeguarding against leakage or attack of the tank walls by the fluid to be stored, as, for example, coating the interior of the tank with a protective material inert to the liquid to be stored. Both liquid plastic and adhesively applied sheet layers have been proposed for this purpose, but each entails serious disadvantages which it is an object of the present invention to obviate. Thus, the use of coatings requires the utmost care in the uniform and complete application of the coating to all parts of the tank. It is also an essential prerequisite that the interior surfaces be thoroughly and properly cleaned. This latter operation alone is very time consuming and difficult to carry out. The slightest omission or oversight in the cleaning operation can result in failure of the coating nullifying the entire protective operation after providing a false sense of security. Futrhermore, failure to apply the coating uniformly is as serious as failure to properly clean the surface before coating.

The foregoing and other serious shortcomings of prior tank protective measures are completely obviated by the present invention utilizing an entirely different device and method for reconditioning tanks long in use or in converting an existing tank for storage of liquids otherwise not capable of storage in that tank. For example, the present invention proposes the use of a tank liner assembly of flexible, lightweight plastic material immune to attack by a wide range of both solid and liquid fluent materials. The liner assembly is adapted to be fully collapsed and compactly packaged for storage, shipment and insertion at the point of use into a previously constructed tank. Once within the tank, the liner is unfolded so that suitable generally rigid reinforcing members can be inserted in prepared receiving pockets carried on the exterior of the liner to the end that the liner can be suspended from and secured to the interior side walls of the tank.

The liner assembly preferably being of slightly greater capacity than the tank proper is held substantially fully extended against the side walls of the tank when filled but without any portion of the walls being placed under tension. Since after installation the stored fluid is confined to the container provided by the liner, it never contacts the walls of the storage tank proper. It is, therefore, unnecessary to clean or perform any but the simplest preliminary conditioning operations on the tank. Small leaks not affecting the strength of the tank are not objectionable since the escape of stored fluid from such leaks provides an automatic indication of a defect in the liner assembly and gives advance warning so that the user can take necessary repair steps before serious consequences result.

The present invention is adapted to be installed in tanks of any construction, shape or size and irrespective of whether the tank was substantially closed as initially erected. In the latter event, it is merely necessary to cut an access manhole in a conveniently accessible portion of the tank wall and through which both the liner assembly and an erecting crew may be admitted. Once this has been completed, the invention provides means by which the cut-out can be used to close the access opening.

Still another feature of the invention is the provision of special couplings by which fluid inlet and outlet pipes, as well as vent devices, can be coupled to the liner assembly and anchored to the tank structure itself.

Accordingly, it is a primary object of the present invention to provide an improved liner assembly for storing fluids within a previously erected storage tank.

Another object of the invention is the provision of an improved storage tank liner assembly especially constructed and arranged for convenient and expeditious erection within a pre-erected storage tank.

Another object of the invention is the provision of the flexible elastomeric tank liner preassembled exteriorly of the storage tank and adapted to be compactly collapsed for insertion through an access opening of the tank.

Another object of the invention is the provision of an improved flexible-walled tank liner for installation in an existing tank in such manner that the original tank is utilized to support the liner and its contents without materially stressing the liner and wherein the liner is utilized to prevent escape of the stored liquid as well as to protect the tank against contact by the liquid.

Another object of the invention is the provision of special means for suspending and securing the walls of a tank liner assembly to the walls of a rigid storage tank, the suspending and securing means being of such a nature as to be readily installed by inexperienced personnel working from within a previously erected rigid tank.

Still another object of the invention is the provision of a flexible tank liner adapted to be attached to the side walls of an existing tank in such a manner that inspection and maintenance crews may be admitted between the rigid tank and the flexible-walled liner at any time during the life of the liner provided the liner does not contain so much liquid as to prevent such entry.

Another object of the invention is the provision of a liner assembly and an improved method of installing the same within a tank, which tank is then rendered incapable of retaining liquid except within said liner and wherein liquid escape holes formed in the bottom of the tank serve as indicators for leaks in the liner.

These and other more specific objects will appear upon reading the following specification and claims and upon considering in connection therewith the attached drawings to which they relate.

Referring now to the drawings in which a preferred embodiment of the invention is illustrated:

FIGURE 1 is a fragmentary perspective view showing the method of installing the collapsed tank liner assembly through the access manhole of a previously erected tank;

FIGURE 2 is a perspective view of a storage tank with portions of the wall broken away illustrating one of the early steps followed in installing the liner assembly;

FIGURE 3 is a perspective view of the tank with portions broken away and showing the tank liner in the process of being elevated to the top of the tank;

FIGURE 4 is a perspective view of a storage tank after the liner assembly has been fully installed therein;

FIGURE 5 is a top plan view of the tank shown in FIGURE 4 with portions of the tank and of the liner broken away to show constructional details;

FIGURE 6 is a perspective view of the reinforcing and support element for the liner assembly;

FIGURE 7 is a perspective view illustrating the manner of inserting the supporting and reinforcing ring into the receiving pockets therefor;

FIGURE 8 is a fragmental transverse sectional view showing constructional details of the top of the tank and liner assembly;

FIGURE 9 is an enlarged detailed sectional view illustrating the construction of one of the coupling assemblies and a method of supporting the same;

FIGURE 10 is an enlarged detailed sectional view illustrating means for attaching the reinforcing ring illustrated in FIGURE 6 to the top of the tank;

FIGURE 11 is a detailed sectional view taken along line 11—11 on FIGURE 4 and illustrating the construction of the coupling assembly adjacent the bottom of the tank and of the liner assembly;

FIGURE 12 is a detailed sectional view illustrating the manner of attaching the reinforcing rings illustrated in FIGURE 7 to the side wall of the tank;

FIGURE 17 is a fragmentary sectional view taken along the top of the tank shown in FIGURE 15 adjacent the liquid inlet coupling;

FIGURE 18 is a cross-sectional view taken along 18—18 on FIGURE 17 showing details of the inlet coupling;

FIGURE 19 is a transverse sectional view along line 19—19 on FIGURE 17 showing other details of the coupling assembly;

FIGURE 20 is a cross-sectional view taken lengthwise of the tank through the outlet or drain coupling assembly;

FIGURE 21 is a side elevational view partly in section with portions broken away showing details of the coupling between the ends of the reinforcing ring;

FIGURE 22 is an enlarged cross-sectional view taken along line 22—22 on FIGURE 17 showing the manner of supporting the upper portion of the liner from the top of the tank; and FIGURE 23 is a view similar to FIGURE 22 but showing an alternate mode of supporting and securing the side of the flexible liner to the side wall of the enclosing tank.

Figure 13:
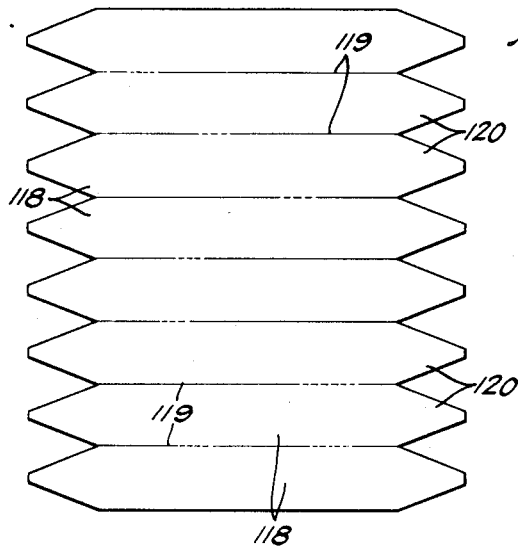
FIGURE 13 is an exploded plan view of the tank liner per se prior to having its end sectors and its main longitudinal seam fused together.
Figure 14:
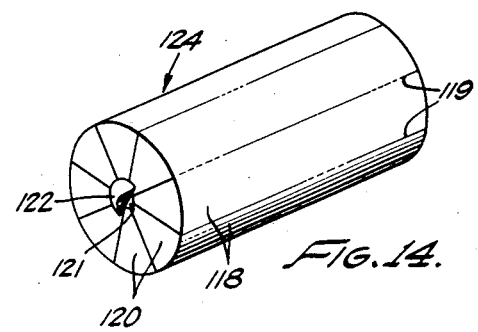
FIGURE 14 is a perspective view of the completed liner body prior to the assembly thereto of receiving pockets for the reinforcing and supporting members.

Referring now specifically to FIGURES 1 to 5 of the drawings there is shown a collapsed, compactly folded, flexible-walled liner designated generally 10 in the process of being lowered through access opening 18 in the top 20 of a pre-erected metal storage tank designated generally 12. It will be understood that tank 12 is of the usual rolled steel type having a cylindrical side wall 14, a top wall 20 and a bottom wall 16. The access opening is here shown as formed in top wall 20 and is adapted to be closed normally by a cover plate 22 suitably secured in place.

Liner assembly 10 is preferably formed from flexible elastomeric or plastic material immune to attack by the fluid material to be stored. There are numerous materials suitable for this purpose and not subject to attack by a wide range of chemical and petroleum products of the type normally stored in tanks. It is pointed out and emphasized that liner 10 preferably has a normal unstressed diameter and length slightly greater than that of the tank in which it is to be installed. A somewhat smaller diameter and axial length of the liner suggested by the drawings is employed merely for convenience of illustration.

The assembly of the closed container provided by the liner is carried out exteriorly of the tank and includes receiving pockets in which can be inserted generally rigid reinforcing and supporting members having provision for attaching the same at intervals to the adjacent portions of the enclosing tank. Referring to FIGURES 4, 5 and 7, it is pointed out that side walls 24 of the liner are provided with narrow circumferentially extending pockets 30 preferably formed from strips of plastic material, the lateral edges of which are fused or otherwise suitably bonded to the liner walls. The pockets so provided form channels for tubular reinforcing members 34. Preferably, the strips forming pockets 30 have their ends spaced from one another circumferentially of the tank to provide access openings through which the ring-like reinforcing members 34 can be inserted in a manner indicated in FIGURE 7. At intervals along the reinforcing rings 34 there are bosses 36 provided with threaded openings 38 in which threaded studs 48 may be anchored. These studs extend outwardly through openings drilled through the walls of tank 12 in order that lock nuts, such as 64, can be run down on the studs to securely lock the reinforcing rings in a desired position.

The upper rim edge of the liner is provided with receiving pockets 50 similar to pockets 30 described above and receive a reinforcing and stress distributing ring 52 similar to ring 34. It is pointed out that rings 34 and 52 preferably encircle the entire liner and each is provided with bosses 36 projecting through gaps between adjacent strips 30 and 50 so that anchoring studs 48 secured therein can be mounted through openings 62 in the tank wall. If the tank is unusually tall, it may be desirable to employ additional reinforcing and anchoring rings supplementing rings 32 and 52 and suitably spaced from one another longitudinally of the tank.

In larger tanks it is desirable to employ supplemental supporting means for the top end of the liner. One mode of providing such supplemental support is shown in FIGURES 4 and 5 as comprising pockets 40 formed from strips of flexible plastic material or the like having their lateral edges bonded to the exterior surfaces of the liner end wall. These form channels through which reinforcing member 42 extends in the manner shown in FIGURE 6. Members 42 are provided at intervals with lugs 46 having saddle straps 44 through which the reinforcing members extend. Anchored within the outer end of lugs 46 are threaded studs 48 which extend through holes drilled in tank top 20 and to the outer ends of which nuts 60 may be secured.

To install the liner within tank 12, the installation crew first lowers the collapsed compactly-wrapped liner 10 through an access opening onto the bottom wall 16 of the tank. Any protrusions or sharp rivet ends on the interior of the tank are removed by grinding or the like. Also any loose material within the tank is removed. However, it is unnecessary to scour, sand blast or resort to other laborious tank cleaning operations. Holes 58 are drilled at the proper intervals through the top and side walls of the tank, separate wires 100 and 104 are passed downwardly through these openings and the inner ends are secured to the ends of threaded members 48 of the reinforcing members for later use in elevating the liner into its installed position. While this work is in progress, other crew members may be engaged in assembling the outlet couplings to the walls of the liner to the lower portion of tank 12.

A suitable coupling for this purpose is illustrated in FIGURE 11 and is seen to comprise a threaded nipple 88 extending through an opening in boss 86 on the wall of the plastic liner. Suitable gasket rings 92 and 94 are clamped between the inner end of boss 86 and a lock nut 90 threaded over the inner end of the nipple. Surrounding the midportion of nipple 88 is a resilient spacer and gasket ring 96 which is held compressed between the walls of the tank and of the liner when an exterior lock nut 100 is tightened against a sealing gasket 98. End cap 102 is applied after the coupling is installed. Once the drain coupling is installed, the discharge hose of a suitable air compressor 106 is coupled to the outer end of nipple 88 to supply air to the liner bag thereby aiding in holding the liner walls partially extended and distributed. In later stages the air pressure is effective in supporting and otherwise assisting in the installation procedure.

It will be understood that the upper end wall 26 of the tank liner bag is provided with a pair of couplings generally similar to the drain coupling described above, and serving as filling and venting devices, respectively. One of these couplings is illustrated in FIGURE 9 and is seen to comprise a threaded nipple 68 having its inner end extended through boss 74 formed in the top wall 26 of the liner. It is held sealed to this boss by a lock nut bearing against a resilient packing washer 72. Surrounding the intermediate portion of the nipple is a resilient spacer 76 having one face bearing against the top wall of the liner and its other face bearing against the top wall 20 of the tank. Nipple 68 extends through a hole 66 in the tank wall and is locked in place by the end of an elbow 80 threaded over the outer end of the nipple. Threaded in the outer end of elbow 80 is a nipple 82 to which a hose may be connected for conveying liquids into the storage container provided by the described liner and tank assembly.

Still a third coupling designated generally 84 understood to be constructed similarly to the described inlet and drainage couplings functions as a venting and breathing device and may be fitted on its outer end with a suitable vent cap permitting equalization of pressure as the liquid level changes without, however, admitting rain water or other foreign objects from without the tank. Both the inlet or filling coupling and breather assembly 84 are preferably located closely adjacent to access opening 18 for convenience of assembly and of servicing.

Before elevating the linear and securing it to the tank walls, the reinforcing tubes 34 and 42 are brought into the tank through opening 18. To facilitate this operation the reinforcing members may be made in sections and provided with telescoping connection so that after introduction into the tank they can be inserted within the receiving pockets 30, 40 and 50 of the liner and coupled together. If the tubing is somewhat flexible as is preferred, it may be formed in long lengths and flexed as necessary to introduce it into the tank. Desirably, the tubing is of hard plastic material. Tubes 34 and 42 are formed into rings within the annular pockets 30 and 50 while straight sections are placed within receiving pockets 40 across the top wall of the liner and joined together at the point of intersection centrally of the top wall. When so assembled, the inner ends of wires 104 are provided with threaded sockets which can be screwed over the ends of threaded studs 48 in the upper reinforcing ring 42 so that wires 104 can be employed to elevate the liner upwardly against the top of the tank, the wires serving to guide threaded studs 48 into accurate registry with holes 58 for reasons made clear by FIGURE 3. It will likewise be understood that the intermediate reinforcing ring 32 may, if desired, have similar wires extending through properly positioned openings in the side wall 14 of the tank for the purpose of guiding and pulling the threaded studs 36 of ring 34 accurately into anchoring position. Once this has been accomplished, the supporting wires are removed one by one as lock nuts are run down on the exposed outer ends of studs 48.

As this operation is taking place, it is most helpful that the compressor 106 be operated to inflate the liner as it is being elevated. In this connection it will be understood that the air pressure applied to the bag is preferably not substantially in excess of atmospheric pressure and is not such as to expand the liner into frictional engagement with the tank walls and interfere with the raising of the liner. Once the inlet and vent couplings, as well as each of the anchoring studs, has been pulled into place and the fastening nuts have been secured, the liner may be checked for leaks and then placed in use.

Figure 16:
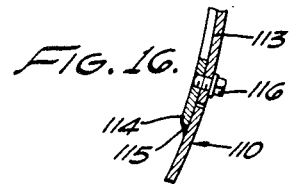
FIGURE 16 is a fragmentary sectional view taken along line 16—16 on FIGURE 15 showing a method of supporting the access port cover.

Referring now to FIGURES 13 to 23, there is disclosed another preferred embodiment of the invention wherein the liner assembly is especially designed and adapted for installation within a horizontally disposed cylindrical storage tank 110 supported on suitable pedestals 111 and having an access manhole in its top side of a size too small to admit a workman. The installation of the liner requires the provision of an access opening sufficient to admit workmen to the tank. Such an opening may be formed by cutting away a portion 113 in the lower side wall of the tank, this portion being laid aside for subsequent use in closing the opening. Referring to FIGURE 16, it is seen that the interior rim edge of the access opening is provided with a framing flange 114 suitable secured to the rim of the opening as by welding 115. The inner edge of the flange is drilled and threaded to provide mounting sockets for cap screws 116 used to resecure cutout 113 detachably in place following the installation of the liner assembly.

The liner assembly is preferably formed of strips of thin sheet plastic material 118 selected to be immune to attack by the liquid or other material intended to be stored in the tank. These strips are suitably fused together along their overlapped edges 119 and the opposite ends of the strips are tapered as indicated at 120 to form the opposite end walls of the generally cylindrical liner assembly. The end tips of the tapered portions 120 may be cut away and the resulting opening 121 may be closed as by a circular disc 122 of the plastic material secured in place thereover as by a suitable bonding agent applied to the contacting surfaces of the disc and liner.

It will be understood that the plastic body of the cylindrical liner so formed provides a sealed container of the same general shape as the tank to be lined with the exception that the dimensions of liner assembly 124 are slightly greater than the corresponding dimensions of the tank with which it is to be used. This provides assurance that when installed and filled with liquid the liner walls will be pressed tightly against the interior walls of the tank without, however, any portion of the liner walls being under tension. Owing to the slight excess of material so provided, those portions of the liner above the liquid level tend to sag and drape inwardly where not held rigidly in place against the tank walls by the liner contents or by the supporting reinforcing members. However, such sagging is in nowise objectionable and may be overcome by the provision of additional ties to the tank walls if this is deemed desirable for any reason. It will therefore be appreciated that the thickness of the liner need be only that required to withstand handling and installation stresses.

The manner of reinforcing the liner and holding it in installed position against the interior walls of the tank, particularly when the tank is unfilled, will be best understood by reference to FIGURES 15 and 17 to 23. Thus, as was described above in connection with FIGURES 1 to 12, liner 124 is provided with elongated pocked-forming strips 125 of plastic material or the like preferably having their ends and opposite lateral edges 126 fused or otherwise firmly bonded to its exterior surfaces. It will be understood that the pockets 127 formed between strips 125 and the liner may be formed with transverse slits near their ends adapted to receive the generally rigid reinforcing and stress distributing members 128 extending lengthwise of the liner as well as the tubular rings 129 surrounding its opposite ends. These reinforcing members, preferably formed of a hard semi-flexible plastic rod or tubing, are similar in structure and function to members 34 and 42 described above in connection with the first preferred embodiment. It is pointed out that three longitudinal pocket-forming strips are preferably provided along the opposite sides and along the top of the liner, these being found adequate to hold the side walls of the liner in position when the tank is empty or only partially filled with liquid without, however, interfering with the inspection and maintenance operations of personnel between the exterior of the liner and the tank wall. The end rings 129 supplement the longitudinal reinforcing members and hold the circular end walls of the liner in position and serve additionally to distribute stresses.

Referring to FIGURE 21, it will be seen that end rings 129 may, if desired, be formed in one or more sections to facilitate the assembly of these rings into the circumferential pocket as well as the introduction of the ring members into the tank through the access opening. The ends of tubes 129 may have axial wells 130 adapted to receive connectors 131 preferably provided with annular teeth disposed to bite into the side walls of wells 130 and hold the ends of sections 129 assembled together.

The means for securing the reinforcing members 128 and 129 to the side walls of storage tank 110 are here shown as comprising eye bolts 133 having threaded stems 134 adapted to extend through holes 135 in the tank wall. The outer ends of stems 134 are provided with a transverse opening 136 to receive pull lines such as those shown in FIGURE 15 for elevating the liner into its fully installed position as described in connection with the first embodiment. It will be observed that the hooked portions of the eye bolts have a wide opening sufficient for the press insertion thereinto of tubes 128 and 129. Once the eye bolt stems have been pulled through openings 135 in the tank wall, the pull lines 137 may be detached sequentially as lock nuts 139 are threaded thereover to lock the liner and its supporting members 128 and 129 assembled to the tank.

If pull lines 137 are wires, as is preferred, the outer ends may be held in any desired position by threading the wire through the mounting screw openings of spring hinges 140. When the leaves of the hinges are released the springs press the leaves apart clamping the wire so that the hinge cannot be slid along the wire. However, when a workman pivots the leaves together, the holes are brought into alignment thereby releasing the grip on the wire so that the hinge can be slid to any desired position.

Another important feature of the liner assembly is illustrated in FIGURES 17 to 20 and comprises coupling assemblies designated generally 145 and 165. Assembly 145 comprises inner and outer rings 146, 147 adapted to be assembled against the inner and outer rim edges of opening 148 formed in the side wall of the tank liner. The rings are held pressed tightly against the opposite faces of the opening by screws 149 disposed in a circle generally centrally of the rings. To prevent any possibility of leakage of fluid past the ring, inner ring 146 is preferably provided with concentric inner and outer grooves 150 and 151 in which are seated O-rings 152, these being adapted to be held tightly pressed against the inner face of the liner upon the tightening of the clamping screws 149.

Preferably, rings 146 and 147 are formed of non-metallic material immune to attack by the liquid intended to be stored in the liner. The threaded bores in ring 146 forming the seats for screws 149 may be provided with suitable metallic inserts molded into the ring material. Due to the disposition of rings 150 and 151 to either side of these inserts and to the fastening screws 149, the liquid cannot come in contact with them. It will be observed that the threaded bores for the clamping screws do not extend through the inner ring but terminate short of the inner face. A non-metallic nipple 154 is preferably threaded into the central opening of inner ring 146 and passes through a slightly enlarged opening 155 in outer ring 147. Likewise, the tank wall 110 is provided with a corresponding oversize opening 156 the edges of which are out of contact with nipple 154.

Referring to FIGURE 18, attention is invited to the manner of mounting the described coupling assembly in the tank wall in such manner that bending stress is not imposed on rings 146 and 147 as would otherwise occur due to the curvature of the tank 110. This happenstance is circumvented by the use of spacer washers 157 of appropriate thickness between ring 147 and the inner wall of tank 110 on at least certain of the mounting screws 158. The described coupling 145 is located at the top side of the liner and usually will be used to fill the tank with liquid. After being filled, a closure cap can be applied to the threaded upper end 159 of nipple 154.

It is also desirable to provide the liner with a second coupling 160 identical with coupling 145 and serving to vent the liner. This coupling is commonly known as a breather device and the outer end of its nipple 161 is normally provided with any conventional hood having openings disposed to admit or to release air or the like without admitting rain or other contaminants from the exterior of the tank.

Figure 15:
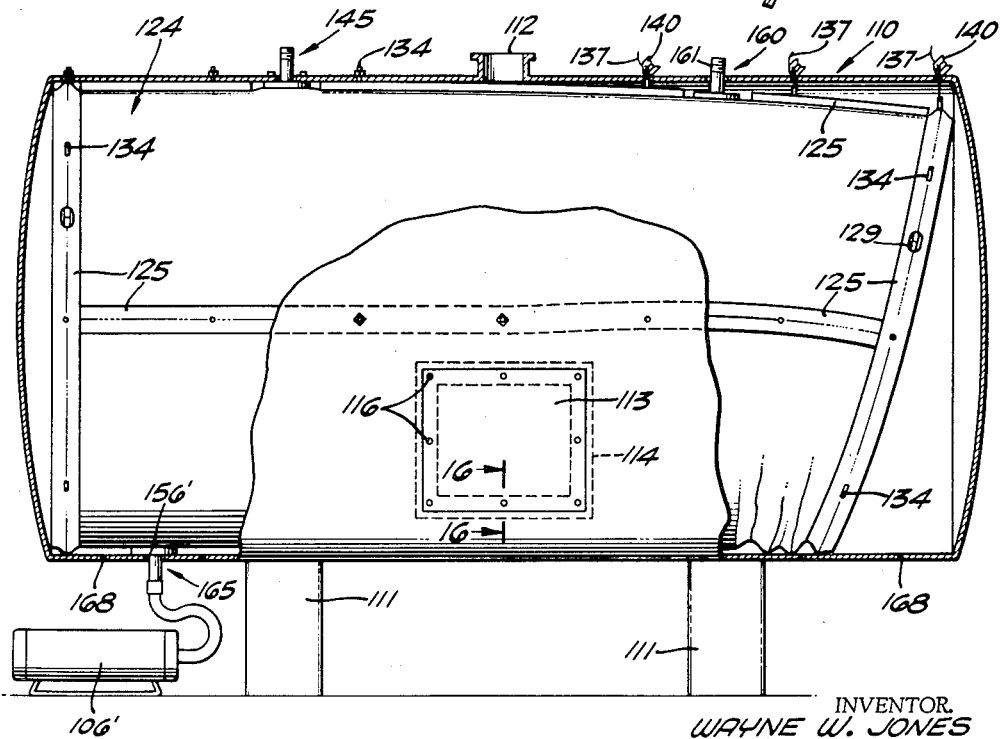
FIGURE 15 is a longitudinal sectional view through a modified embodiment of the invention showing the flexible liner assembly therefor in the process of being secured in assembled position.

FIGURES 15 and 20 show a third coupling designated generally 165 disposed in the lower portion of the liner and substantially identical with coupling assembly 145. Coupling 165 serves to drain fluid from the bottom of the tank and is held in assembled position in an opening in the tank wall by mounting screws 166.

Another important feature of the invention is the provision of weep holes 168 distributed along the lower portion of tank 110 and having several important functions. Among these is that of venting the space between the exterior of the liner and the interior walls of the tank. Moisture may condense on the interior wall surfaces and if provision were not made for draining this from the tank, corrosion would result. Another function is that of admitting or venting air from the tank as the liner walls drape inwardly when the liquid level falls.

A further and particularly important function of weep holes 168 is that of providing visual indication of liner leakage should this develop at any time during the use of the tank. Even the slightest leak will result in liquid flowing downwardly to the bottom of the tank from which it will drip through weep holes 168 thereby providing a wet, dark area on the outside of the tank readily detected visually by anyone in the vicinity. In this way, immediate notice is given should a leak develop in the liner. Accordingly, the tank can be drained immediately following detection and the access cover 113 can be removed thereby permitting entry to the tank and inspection of the liner for the leak and prompt patching before the escaping liquid can cause serious damage to the tank itself.

Referring to FIGURE 23, there is shown an alternate mode of attaching pocket-forming strips 125 to the exterior of the liner. The parts corresponding to those described above have been designated by the same numerals distinguished by a prime. It will be noted that the upper edge of strip 125' has been turned inwardly beneath the body of the strip and there secured to the body of the liner. Accordingly, the suspension forces transmitted through both lateral edges of strip 125 act in vertical shear across the fused joints between the strip edges and the body of the liner. For this reason the FIGURE 23 construction is found to be stronger than that illustrated in FIGURE 22 but it is somewhat more difficult to assemble.

The installation of the second described liner assembly in tank 110 is accomplished in substantially the same manner described above in connection with the first embodiment. It is, of course, necessary to first cut away portion 113 of the tank wall to provide an access opening through which the collapsed liner 124 can be inserted. Once placed inside the tank, the liner is unfolded and an air compressor, such as vacuum cleaner 106′, is connected to the drainage coupling 165 after the nipple of the latter has been inserted through opening 156′ in the bottom of the tank. Operation of the cleaner forces air under pressure into the liner, care preferably being taken to close the outlet ends of nipples 154 and 161, respectively, to prevent leakage. The slight air pressure thus provided is effective in extending the walls of the liner and in facilitating the insertion of the reinforcing tubes 128 and 129 in pocket 127. These non-metallic reinforcing tubes may be made of rigid plastic not subject to corrosion or attack by liquids to be stored in the liner. Following the insertion of the ring reinforcing members and the longitudinal reinforcing members, pull wires 137 are inserted through the bolt holes in the side walls of the tank and attached to the holes 136 in the eye bolts 133, the latter being inserted through holes in strips 125 and pressed about the reinforcing members. Once the various pull wires have been inserted and the exterior ends have been fitted with clamping hinges 140, the liner is in readiness to be elevated into its fully installed position.

This operation is carried on in the same manner described above in connection with FIGURES 1 to 12, the pull wires being detached sequentially and locking nuts 139 being threaded over the protruding ends of the eye bolts to lock the liner in its installed position. The coupling members are also secured in the openings provided therefor at the upper and lower portions of the tank and the mounting screws are locked in place. Meanwhile, the air supply means 106′ is operated as necessary to aid in inflating the liner and in raising it into assembled position. If desired, a valve may be provided in the supply connection to prevent air escape when the blower is not being operated.

After the liner has been fully installed and locked in place, cover 113 may be replaced to complete the operation. Testing may be carried out by introducing a quantity of water and checking for leakage through weep holes 168. Further checking may be made by removing the access cover 113 and walking along the space between the liner and the tank wall. Should a leak develop, it is quickly and easily repaired by placing a patch over the area found moist from leakage. If the leakage is found in the upper portion of the wall, it may be necessary to temporarily detach one of the longitudinal reinforcing members so that the wall can be collapsed inwardly to give access to the leaky area.

In conclusion it is pointed out and emphasized that the described liner assembly is far more economical than other proposals heretofore made for converting metal and wooden tanks to use for storing liquids likely to attack the same. A principal reason for this is that very thin sheet material may be used since the strength of the tank rather than that of the liner is utilized to support the liquid. Supplementing this is the use of rigid reinforcing and load distributing members horizontally along the side walls at suitable vertical intervals so arranged as to support the liner side walls continuously along horizontal lines and in such manner as to avoid all points of stress concentration within the liner material since these inevitably lead to failure of the liner.

Furthermore, the fact that the liner is preferably made larger than the tank for which it is intended does not mean that the resiliency of the material is not called upon to serve a useful purpose. For example, it sometimes happens that the liner is not fully and uniformly draped from its lines of support prior to being filled. In consequence of this and of the sticking of the liner to the tank walls, the elasticity of the material is called upon to stretch to the extent required for expansion into contact with the tank wall. Were it not for this capability, the liner would rupture and spill its contents into the tank for escape through the weep holes.

While the particular tank liner assembly and method of installing the same herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A flexible-walled container for the bulk storage of liquids, said container comprising thin sheet-like walls of flexible plastic material impervious to fluids, said walls being of insufficient strength to withstand the stresses imposed by a full charge of liquid and being designed for disposition in a surrounding supporting chamber having dimensions conforming generally to but smaller than the dimensions of said container, fluid passage and coupling means supported entirely by and secured directly to and extending through the walls of said container and by which liquids can be supplied to and withdrawn therefrom, and a plurality of independent spaced-apart means attached to said container for detachably supporting the same from the juxtaposed portions of a surrounding supporting chamber.

2. An article of manufacture comprising a collapsible flexible-walled closed bulk storage container having thin walls of pliant plastic-like material immune to attack by the liquid intended to be stored therewithin, said container having a relatively small bore fluid passage forming means detachably secured in an opening through its wall, said passage means including a pair of flange rings disposed in registry with said opening and in direct surface contact with the opposite sides of said plastic-like container material and having gasket means adapted to seal against at least one face of said material concentrically of the opening, and means for clamping said rings and gasket sealed about the opposite faces of the container material, the outer end of said passage means being adapted to extend freely and loosely through an opening in the wall of an enclosing and supporting tank for said container.

3. An article as defined in claim 1 characterized in the provision on its exterior of receiving pockets for rigid reinforcing and stress distributing means, long arcuate-shaped reinforcing means extending circumferentially of said container within said pockets, and means cooperating with said reinforcing means adapted to be supported by an enclosing tank for said container and being cooperable therewith to secure the container detachably to the tank.

4. An article as defined in claim 3 characterized in the provision of threaded fastener means operable to secure said passage forming means and said reinforcing ring means firmly in place against the interior surface of an enclosing tank for said container by an operator positioned exteriorly of the tank.

5. A collapsible unitary container and liner assembly adapted to be installed within a previously erected bulk storage tank, said container comprising a thin flexible-walled closed chamber formed from sheet plastic material and of a size slightly greater than the size of the tank with which it is intended to be used, elongated open-ended pockets extending along the exterior of said container and formed from strips of plastic material fused along their opposite edges to the wall of the container, and nonmetallic substantially rigid reinforcing members positioned in said pockets and cooperable therewith and with threaded fastener means to secure said container against the interior walls of an enclosing tank for said container, said reinforcing members being effective to distribute stresses within the walls thereof over a wide area to avoid excessive stress concentrations adjacent said threaded fasteners.

6. Fluid coupling means adapted for assembly to a flexible-walled liner for bulk storage tanks from within the tank itself, said coupling means including a pair of generally flat rings adapted to be assembled against the opposite faces of an opening through the wall of a plastic liner for said storage tank, one of said rings having a pair of concentric grooves opening through one radial face thereof, resilient O-ring sealing gaskets seated in said grooves, threaded fastener means for clamping said rings against the rim faces of said container opening, said fastener means extending through openings in said rings in an area located between said gasket rings, nipple means detachably seated in the inner one of said rings and extending outwardly through the container opening and through the outer one of said rings.

7. Fluid coupling means as defined in claim 6 characterized in the provision of means in said outer ring for detachably clamping the same against the interior rim edge of an opening through a storage tank, said clamping means including a threaded member adapted to be applied and tightened from the exterior of a tank in which said coupling means is mounted.

8. Fluid coupling means as defined in claim 6 characterized in the provision of mounting means associated with the outer one of said rings for supporting said coupling rigidly against the inner rim of an opening through the wall of a storage tank, said mounting means including threaded fasteners adapted to be tightened from outside the storage tank, and spacer means adapted to be positioned between said outer ring and the juxtaposed surface of the tank to hold said coupling rings spaced inwardly of and substantially out of contact with the tank wall.

9. Reinforcing and stressing distributing members adapted for use in supporting a flexible-walled liner within and against the interior walls of a bulk storage tank, said members comprising elongated flexible generally rigid members adapted to be inserted in receiving pockets therefor provided on the exterior side of a flexible tank liner assembly, said members including threaded fastener means at spaced intervals along said members adapted to project through mounting openings therefor in a tank, said threaded fasteners being operable from the exterior of the tank for the purpose of clamping said stress distributing members against the interior side of the tank, and said elongated members being adapted to distribute stresses along the side wall of a flexible-walled liner overhanging said member while held suspended thereon.

10. Reinforcing members as defined in claim 9 characterized in that the same are shaped to form a split ring adapted to encircle and closely embrace the exterior of a flexible-walled liner, and coupling means adapted to be inserted within axial walls opening through the adjacent ends of said split ring, said ring being sufficiently flexible to facilitate its insertion through a tank access manhole and assembly into a receiving pocket formed therefor in a flexible-walled tank liner.

11. A tank liner assembly adapted to be collapsed for insertion through a bulk storage tank access opening and thereafter suspended loosely against the interior walls thereof, said liner comprising a closed thin-walled plastic container slightly greater in size than the interior of the bulk storage tank for which it is intended, and means for holding said liner suspended from the tank wall and for distributing the stresses incident thereto through the walls of the liner, said means including elongated strips of flexible material extending along the exterior side of the liner to form a receiving pocket for a rigid stress distributing member, the opposite lateral edges of said strips being fused to the liner wall.

12. A tank liner assembly as defined in claim 11 characterized in that one edge of said strips is folded under the body portion of the strip and there fused to the liner wall.

13. A tank liner assembly adapted to be erected and suspended from the interior of a previously erected horizontally disposed cylindrical bulk storage tank, said assembly comprising a thin-walled liner of flexible impervious material closed except for fluid inlet and outlet openings and having dimensions corresponding to but slightly greater than those of the tank to be lined, reinforcing and stress distributing members mounted in the side walls of said liner and distributed in spaced relation to one another substantially from end-to-end thereof, and a plurality of independent fastener means accessible from the exterior walls of the tank for securing said reinforcing and stress distributing members to the interior walls of the tank.

14. A tank liner assembly as defined in claim 13 characterized by the provision of means for venting continuously to the outside atmosphere the space between the interior of the tank and the exterior of said liner, said venting means being located at least in part in the lower portion of the tank.

15. A tank liner assembly adapted to be installed in and supported by the walls of a previously erected bulk storage tank for the purpose of continuing said bulk storage tanks in service without need for performing costly conversion and reconditioning operations thereon, said assembly comprising a flexible-walled cell of thin resilient sheet thermoplastic material immune to attack by the liquid to be stored and having a capacity corresponding to that of the tank for which it is intended, means for suspending said liner from a plurality of vertically spaced-apart substantially continuous lines of support arranged generally horizontally around the interior of the tank being lined, said liner cell normally hanging loosely against the interior side walls of the tank in which it is installed, and said liner walls being adapted to stretch into contact with the tank walls whenever this is necessary due to the uneven draping of the liner walls or the like reason.

References Cited by the Examiner
UNITED STATES PATENTS

| | | | |
|---|---|---|---|
| 2,401,606 | 6/46 | Brown. | |
| 2,630,236 | 3/53 | Arkoosh | 220—63 |
| 2,884,978 | 5/59 | Grimm | 150—5 |
| 2,994,452 | 8/61 | Morrison | 220—9 |

THERON E. CONDON, *Primary Examiner.*

EARLE J. DRUMMOND, GEORGE O. RALSTON,
*Examiners.*